(No Model.) 7 Sheets—Sheet 2.

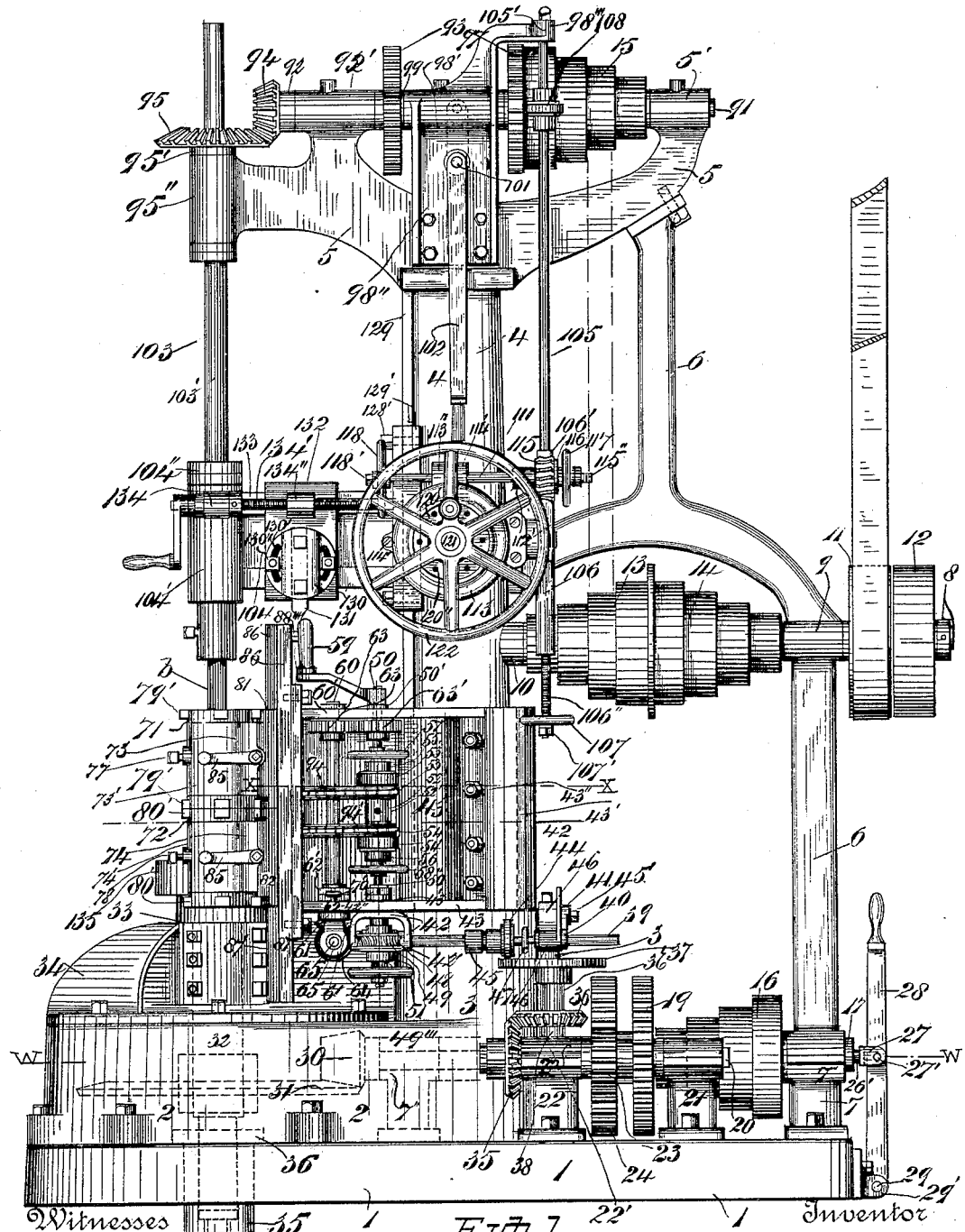

J. B. ALLFREE.
AUTOMATIC TURNING AND BORING MILL.

No. 462,757. Patented Nov. 10, 1891.

Witnesses  
M. M. Defrees  
C. P. R. Oppenheim

Inventor  
James B. Allfree  
By his Attorney  
Thompson R. Bell

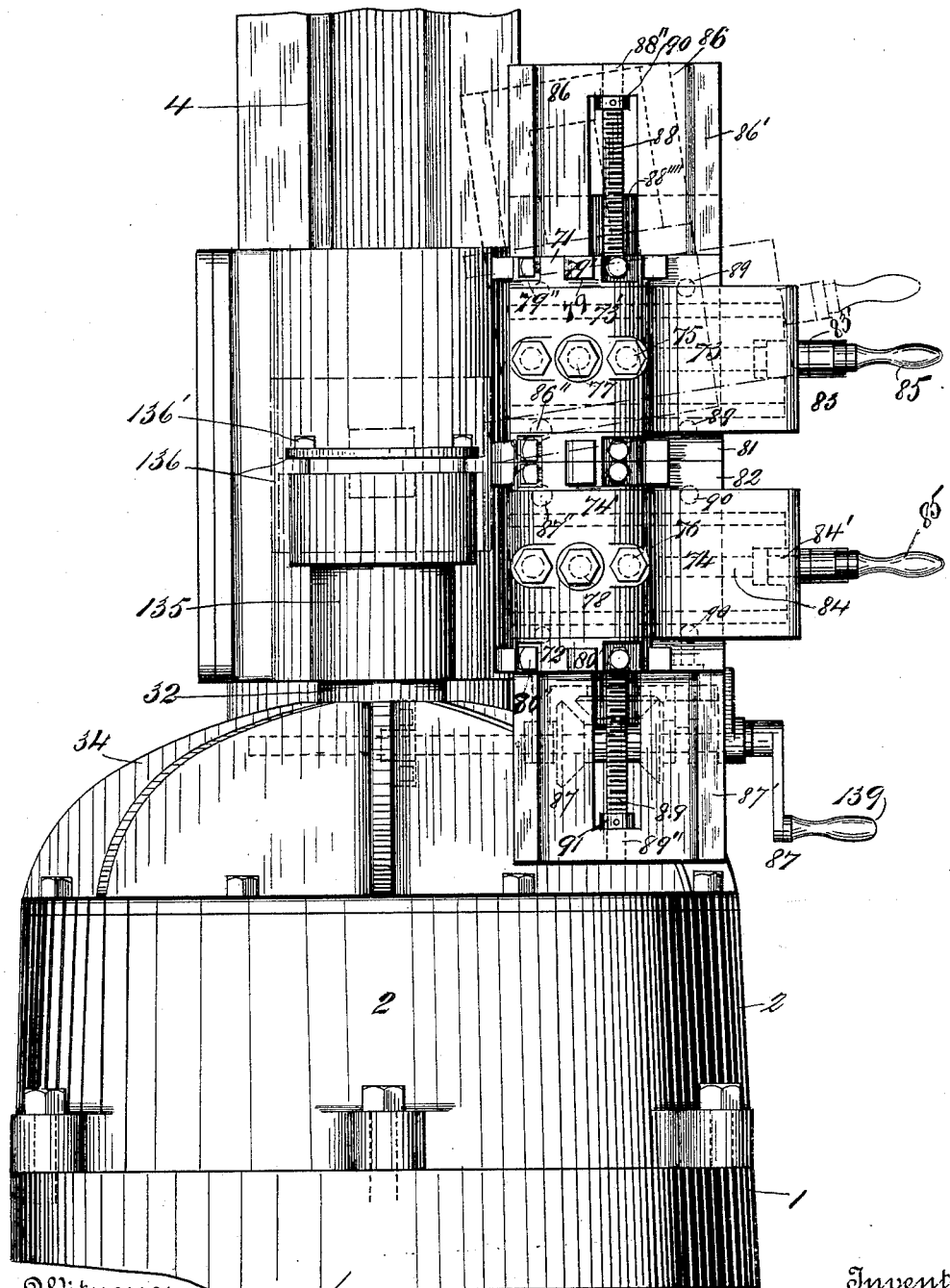

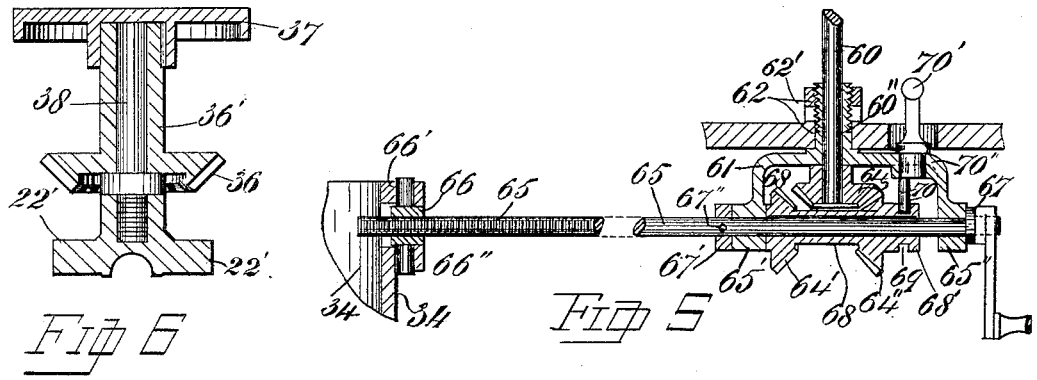
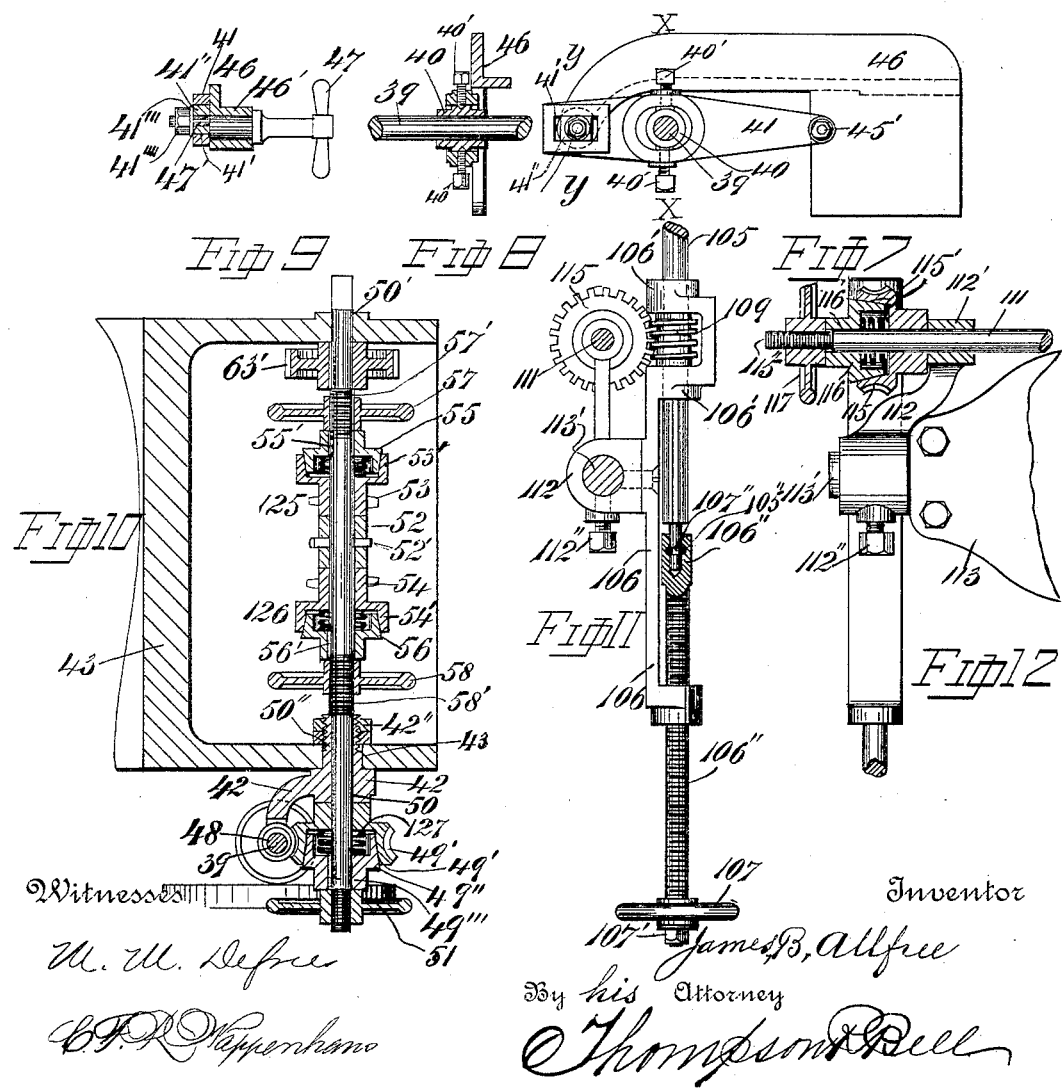

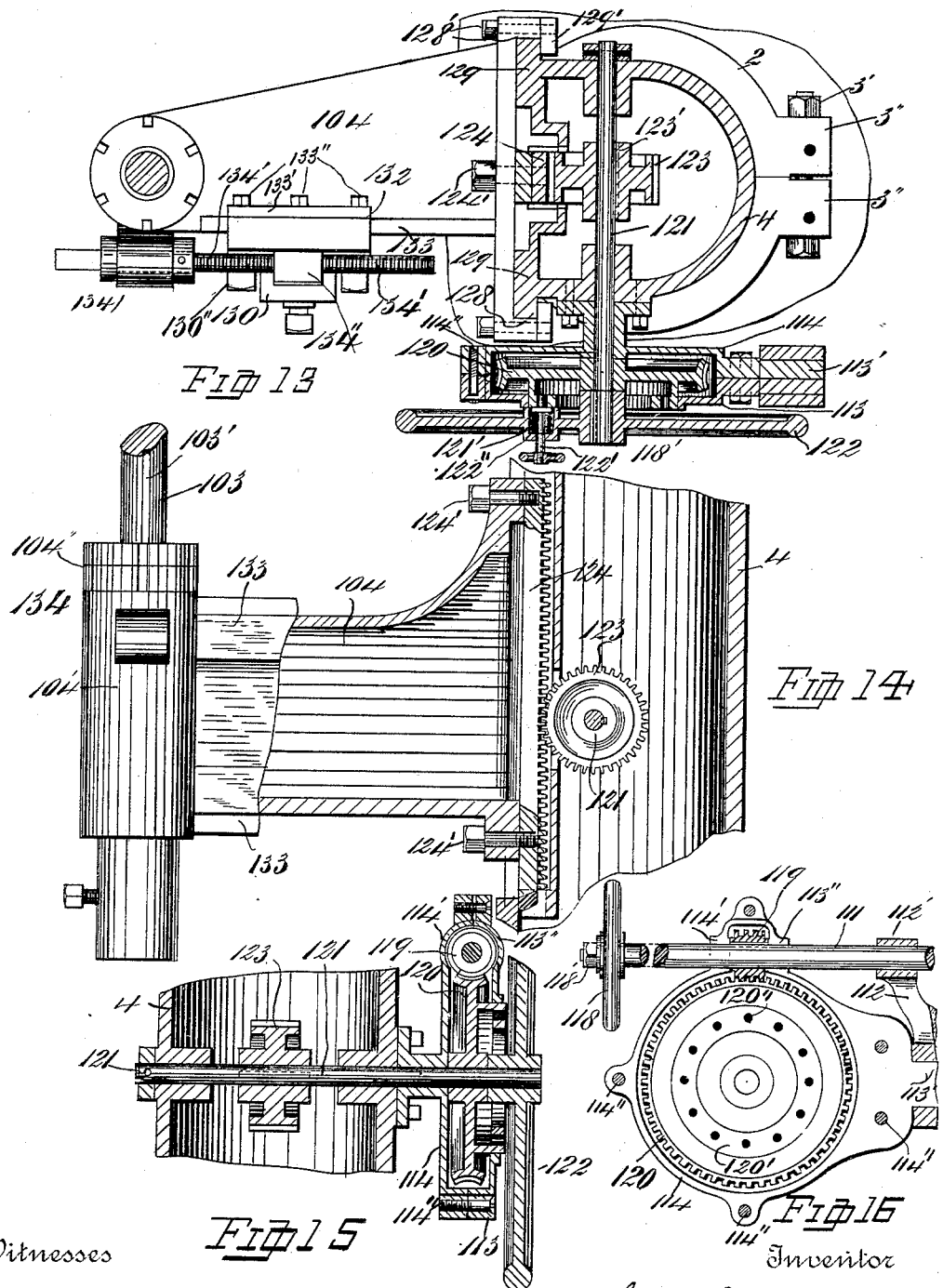

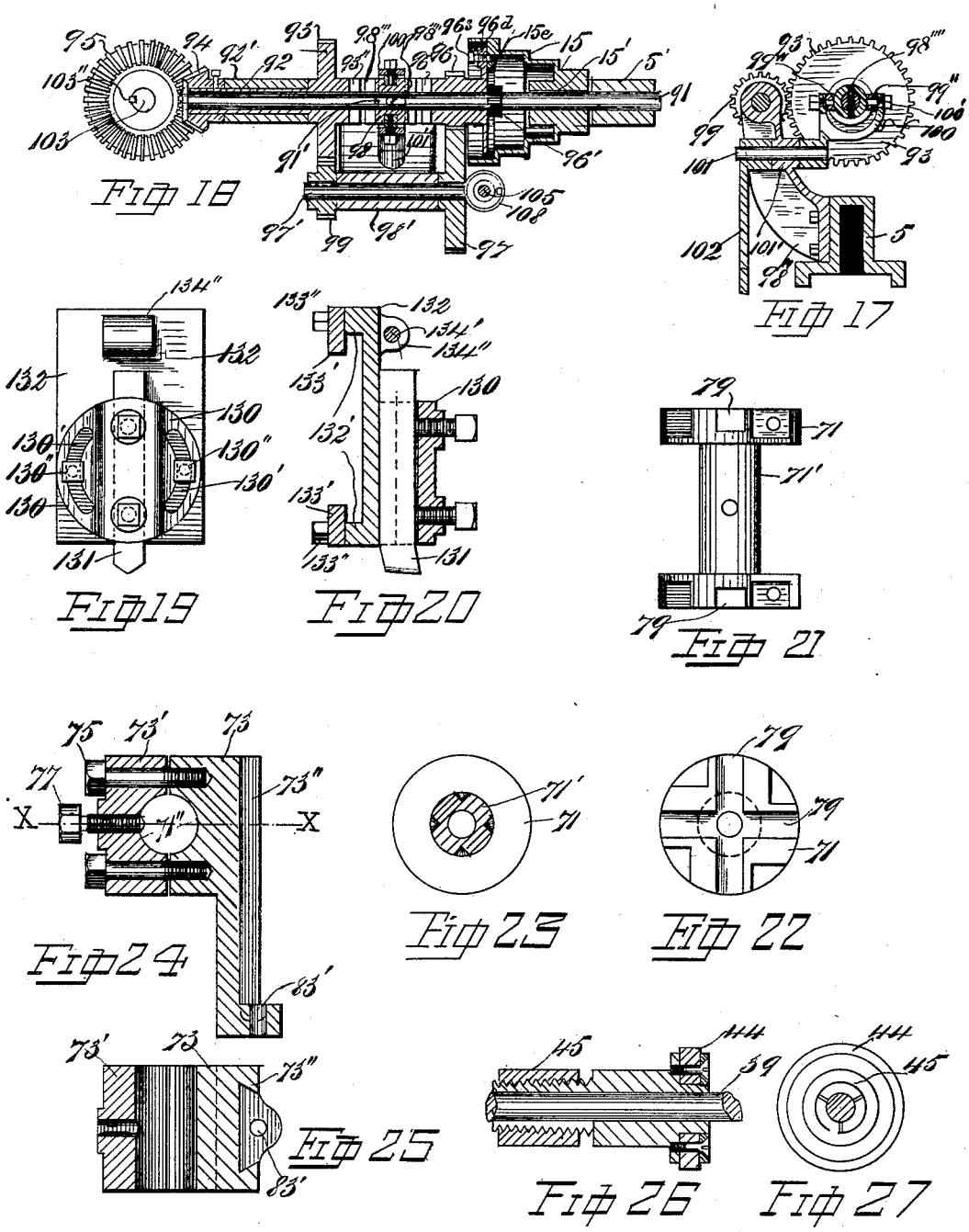

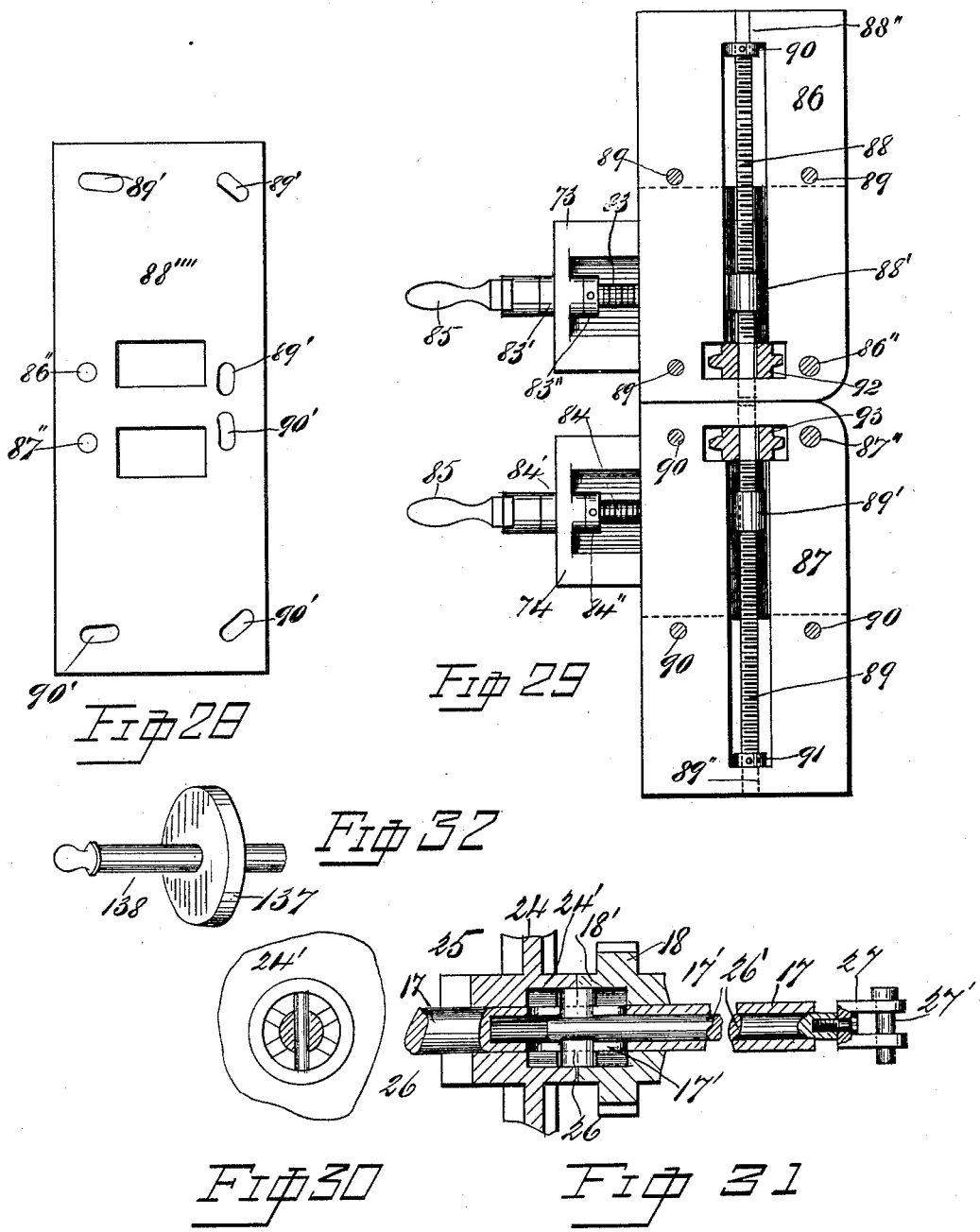

UNITED STATES PATENT OFFICE.

JAMES B. ALLFREE, OF INDIANAPOLIS, INDIANA.

AUTOMATIC TURNING AND BORING MILL.

SPECIFICATION forming part of Letters Patent No. 462,757, dated November 10, 1891.

Application filed January 22, 1891. Serial No. 378,659. (No model.)

*To all whom it may concern:*

Be it known that I, JAMES B. ALLFREE, a citizen of the United States, residing at Indianapolis, in the county of Marion and State of Indiana, have invented new and useful Improvements in Automatic Turning and Boring Mills, of which the following is a specification.

My invention relates to a new and improved machine for automatically turning, boring, facing, and key-seating pulleys and other similarly-formed pieces of mechanism, as shaft-couplings, &c.; and it consists in a swinging arm whereon turning-tools are mounted and a facing device mounted on a raising and lowering arm, all hereinafter described.

The object of my invention is to provide a machine whereby the pieces to be operated upon may be readily placed in position and automatically trued or centered ready to be turned, bored, faced, or otherwise worked upon, and when finished may be readily removed therefrom and without loss of time; also, to provide means whereby the cutting, facing, turning, and boring tools may be brought into simultaneous or independent operation; also, to provide mechanism whereby any or all of the operating-tools may be instantaneously stopped or withdrawn from the work without stopping the machine; also, to provide means whereby the facing-tools may be set to cut or face at any desired angle or angles of either the same or different inclinations; also, means for automatically traversing said facing-tools either alternately or simultaneously in opposite directions, and, also, means for rapidly changing the facing-tools without removing them from their holders. I attain these objects by the mechanism illustrated in the accompanying drawings, in which—

Figure 3:
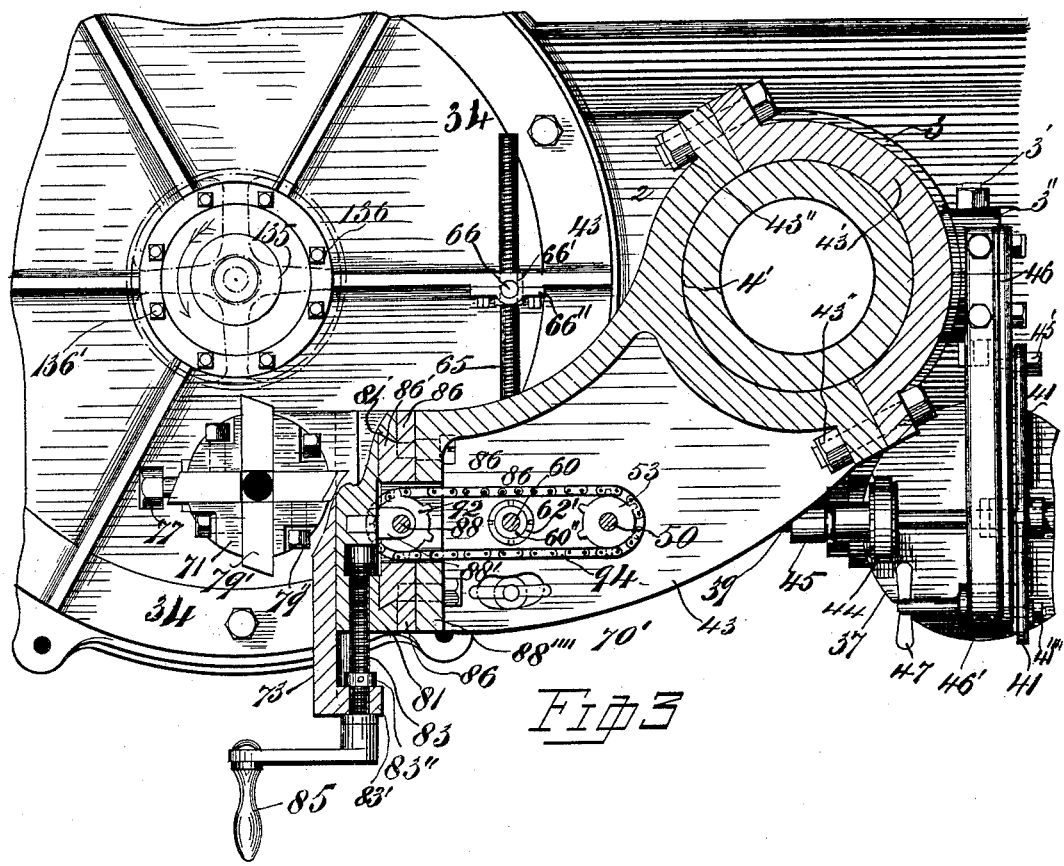
Figure 2:
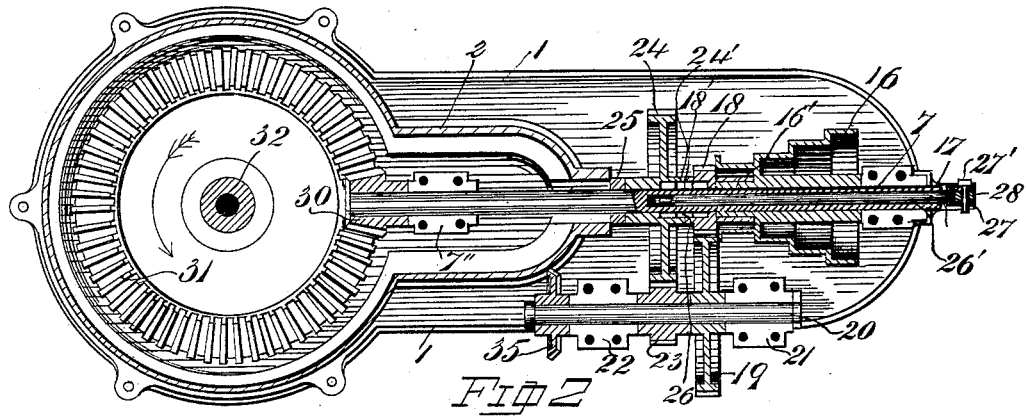

Figure 1 is a side elevation of the machine. Fig. 2 is a sectional plan of the same through the line $w\ w$. (See Fig. 1.) Fig. 3 is an enlarged part plan of the bed, showing the swinging arm, partly in section, which is one of the principal features of my machine. (See Fig. 1, line $x\ x$.) Fig. 4 is an enlarged front elevation of the lower portion of my machine, showing the manner of inclining the facing-tools in dotted lines and the turret tool-holders in their cutting positions when ready to face or turn the piece. Fig. 5 is a detail view of the mechanism for automatically swinging the swinging arm inwardly and outwardly. Fig. 6 is a detail sectional view of the friction-disk for driving the feed mechanism of the swinging arm. Fig. 7 is a detail view of the arm for supporting the outer or telescoping end of the friction-shaft 39. Fig. 8 is a detail section of the same through the line $x$ $x$. (See Fig. 7.) Fig. 9 is also a detail section of the same through the line $y\ y$. (See Fig. 7.) Fig. 10 is a front sectional elevation of the swinging arm through the axis of the shaft for traversing the turret-tools and showing the engaging and disengaging mechanism in section. (See line $a\ b$, Figs. 1 and 3.) Fig. 11 is a detail view of the vertical friction-shaft, showing its adjusting and driving mechanism. Fig. 12 is a side elevation of the same, showing the clutch engaging and disengaging mechanism. Fig. 13 is a part-sectional plan of the arm for supporting the boring-spindle and the hub-facing rest, which, in connection with Figs. 14, 15, and 16, illustrate the feed mechanism of the boring-spindle. Fig. 14 is a detail sectional elevation of the same, showing the raising and lowering rack and pinion. Fig. 15 is a sectional elevation of the column along the axis of the rack-pinion shaft, showing its worm driving-gear. Fig. 16 is a side elevation of the worm driving-gear with its front casing removed. Fig. 17 is an end sectional elevation of the boring-spindle, driving-gearing, and clutch mechanism. Fig. 18 is a sectional plan of the same. Fig. 19 is a front elevation of the hub-facing-tool rest. Fig. 20 is a sectional end elevation of the same. Fig. 21 is an elevation of the turret tool-holder, which, in connection with Figs. 22 and 23, illustrates another of the important features of my machine. Fig. 22 is a plan of said turret tool-holder. Fig. 23 is a transverse sectional plan of the same at the center. Fig. 24 is a sectional view of the the turret holder or carriage through the axis of its cross-feed screw. Fig. 25 is a transverse section of the same through the line $x\ x$. (See Fig. 24.) Fig. 26 is a detail sectional view of the lower friction-wheel, showing its securing-clamp. Fig. 27 is an end elevation of the same. Fig. 28 is an end elevation of the swinging arm with its traversing carriages and connections removed. Fig. 29 is an elevation of the backs of the adjusting-plates, on which are mounted the carriages for supporting and traversing the turrets and their tool-holders, and showing their pivotal centers and the position of their securing-bolts. Fig. 30 is an end elevation of the lower driving-shaft clutch. Fig. 31 is a longitudinal section of the same through the axis of the shaft, and Fig. 32 is a perspective view of the truing-roller and its mandrel which I employ for truing or centering the work to be turned.

Similar numbers of reference designate like parts throughout the several views.

1 designates the bed or foundation framing. 2 is the base framing or casing firmly bolted to said foundation-framing and having formed thereon and integral therewith the split socket 3, said socket adapted to receive and tightly clamp the base of the column 4 by means of the clamping-bolts 3'.

5 designates the upper or capital framing, securely bolted to the top of the column 4, and 6 is the back framing securely bolted to the frame 5, the column 4, and to the base 7. (See Fig. 1.)

8 designates the main or counter shaft, journaled in the bearing 9, formed integral with the frame 6, and in the bearing 10, formed integral with the column 4, and having the usual tight and loose pulleys 11 and 12, and also provided with the stepped cone-pulleys 13 and 14, firmly secured thereon, and which transmit motion to the top speed or cone-stepped pulley 15 and the lower speed-pulley 16 by the usual belt connections hereinafter described.

17 designates the lower driving-shaft for driving the turning spindle journaled in the bearing 7', formed on the base 7 and the bearing 7'', and is provided with the speed-cone 16, loosely mounted thereon.

On the hub 16' of the pulley 16 is firmly secured (by a key or other suitable device) the clutch-pinion 18, having the clutch 18' formed thereon and integral therewith. Said pinion, meshing with the wheel 19, firmly secured on the shaft 20, rotates the same in its bearings 21 and 22. On this latter shaft is also rigidly secured the pinion 23, meshing with the clutch-wheel 24, having the clutch 24' formed thereon. Said wheel, being also loosely mounted on the shaft 17, is held in its relative position adjacent to and touching the clutch-pinion by the collar 25.

I provide the clutch-key 26 neatly fitting the slots 17', formed in the shaft 17 and secured to the end of the slide-rod 26', loosely fitting and adapted to slide in the bore of said shaft, said rod 26' having its opposite end pivoted to the fork 27, jointed on the lever 28 by the pin 27', said lever being fulcrumed on the pin 29 of said bracket 29', secured to the main frame 1, for the purpose of disengaging and engaging either or disengaging both the clutches 18' and 24'. On the shaft 17 is also secured the bevel-pinion 30, meshing with the bevel-wheel 31, secured by a suitable key to the vertical spindle 32, on which is secured at its top end the securing-chuck 135, said spindle journaled at its top end in the bearing 33, formed on the casing 34. Said casing, being firmly bolted to the casing 2, secures and holds the upper portion of said spindle in its true position, this spindle having its bottom end journaled in the step-bearing 35, fitted into the base 1, and resting on its integral collar 36 maintains the spindle 32 in its true vertical position. The vertical spindle is preferably made hollow to permit the boring-tool to freely enter therein when so required. On the end of the shaft 20 is also secured the miter-wheel 35, meshing with the miter-wheel 36, provided with the socket or sleeve 36', formed thereon and integral therewith, and on which is secured at its top end the friction-disk 37 by a key or other suitable device. Said wheel and its socket, mounted on and adapted to rotate on the stud 38, secured on the cap 22' of the journal-bearing 22, rotate the feed mechanism of the swinging arm hereinafter more fully described.

39 designates the horizontal friction-shaft having its outer end telescoping or sliding into the swivel-bearing 40, secured and adjusted by the set-screws 40', screwed in the engaging and disengaging lever 41, and having its opposite end journaled in the bearing 42', formed on the supporting-hanger 42. Said hanger, swiveled in the arm 43, permits the latter to be readily swung outwardly and inwardly (see Figs. 7, 8, and 9) on its bearings 4', formed on the column 4. I provide the cap 43', secured on said arm by the bolts 43'', for the purpose of removing the same without necessitating the removal of the column 4 and the mechanism attached thereto.

44 designates the friction-wheel rotated by the disk 37, hereinbefore described, and adjustably secured by the sleeve-coupling 45 (see Fig. 26) to the shaft 39, and engaged and disengaged from and with said disk by the lever 41. Said lever, fulcrumed on the stud 45', securely screwed in the supporting-arm 46, bolted to the rib 3'' of the base 2, is raised and lowered by means of the operating-handle 47, adapted to turn in the bearing 46', formed on the arm 46, and provided with the eccentric or crank pin 47', loosely fitting in the sliding block 41'', sliding in the slot 41', formed in the end of the lever 41, said block being held in position in said lever by the washer 41''' and nut 41'''', screwed on the threaded end of the crank-pin 47'.

48 designates the friction-shaft worm firmly secured on the friction-shaft 39 by a suitable key and meshing with the worm-wheel 49, loosely mounted on the shaft 50, and having the chamber 49' formed on the bottom thereof and adapted to receive and to engage with the clutch 49'', loosely secured on the shaft 50 by the key 49''' and adapted to slide longitudinally thereon and to turn therewith and engaged and disengaged by the hand-wheel 51, screwed on the threaded end of said shaft.

(See Fig. 10.) The vertical shaft 50, journaled in the bearing 50', formed in the top rib of the swinging arm 43, and in the bearing 50'', formed in the neck of the supporting-hanger 42, loosely fitting the bottom bearing 43' of said swinging hanger, held in position by the lock-nut 42'', is provided with the distance-sleeve 52, secured thereon at or near its center by the set-pin 52' and the upper and lower adjacent sprocket-wheels 53 and 54, mounted loosely thereon, said wheels having the chambers 53' and 54' formed on their faces and adapted to engage and disengage with the friction-clutches 55 and 56, loosely mounted and secured by the keys 55' and 56', secured on said shaft and adapted to slide thereon and to turn therewith, and to be disengaged and engaged by the hand-wheel 57 and 58, screwed on the threaded portion 57' and 58' of the shaft 50. The top projecting portion of the shaft 50 is preferably of square form to receive the eye of the crank-handle 59 for manually operating the shaft when the clutch mechanism is disengaged.

60 designates the driving-shaft of the swinging arm, journaled in the bearing 60', formed on the top rib of said arm, and the bearing 60'', formed in the neck of the hanger 61. Said hanger, swiveled in the bearing 62, is loosely secured therein by the lock-nuts 62', said shaft having the gear-wheel 63 firmly secured thereon at its top end and meshing with the wheel 63', secured on the shaft 50, from which it derives its motion. It is also provided with the miter-wheel 64, secured on the lower end thereof, for the purpose hereinafter described.

65 designates the screw-shaft for swinging the herein-described swinging arm, having its threaded end screwed into the trunnion-nut 66. Said nut has its trunnions journaled in the bearings 66', formed on the inner rib of the casing-cover 34. Said bearing is provided with the removable cap 66'' for the purpose of removing said nut. Said shaft has its opposite end journaled in the bearings 65' and 65'', formed on the hanger 61, and is held in position by the end collar 67, Fig. 5, formed thereon, and the inner loose collar 67' is secured thereon by the set-pin 67'', and is provided with the reversing miter-wheel 64' and 64'', formed on the socket 68, secured on said shaft and adapted to turn therewith and slide longitudinally thereon to engage alternately the miters 64' and 64'' with the miter-wheel 64, hereinbefore described. (See Fig. 5.) On the prolonged end 68' of the socket 68 is formed the annular groove 69, receiving the end of the crank-pin 70, formed on the engaging and disengaging handle 70'. Said handle, being journaled in the bearing 70'', formed in the hanger 61, is readily revolved in either direction to engage or disengage the miter-wheels 64' and 64''.

71 and 72 designate the top and bottom duplex turret tool-holders, (see particularly Figs. 1, 3, and 4 and detail view of turret tool-holder 71 in Figs. 21, 22, and 23,) having their journals 71' and 72', fitting the bearings 71'' and 72'' of the turret-supporting carriages 73 and 74, said bearings clamped by the caps 73' and 74', secured by the clamping-bolts 75 and 76 and adjusted by the set-screws 77 and 78, said turrets having the slots or grooves 79 and 80 formed on the ends thereof and into which are inserted and firmly secured therein the facing-tools 79' and 80' and removably secured therein by the bolts 79'' and 80''.

On the turret-supporting carriages 73 and 74 are formed the V-ways 73'' and 74'', engaging the V-guides formed on the vertical traversing-carriages 81 and 82, on which said turret-carriages are adapted to slide and to be traversed thereon in an inwardly and an outwardly direction by the screws 83 and 84, screwed into the bodies of said carriages 81 and 82 and journaled in the bearings 83' and 84', formed on the ends of said turret-supporting carriages, and held in position by the collars 83'' and 84'', and operated by the crank-handle 85.

The carriages 81 and 82, provided with the V-ways 81' and 82', accurately fitting the V-guides 86' and 87', formed on the adjusting-plates 86 and 87, are traversed upwardly and downwardly thereon by the feed-screws 88 and 89, said screws having their threaded ends screwed into the nuts 88' and 89', firmly screwed into said traversing-carriages and having their opposite ends journaled in the bearings 88'' and 89'', and held in position by the collars 90 and 91, secured thereon, and by the hubs of the sprocket-wheels 92 and 93, said sprockets receiving their rotative motion from the driving-chains 94 and 94', meshing with the sprocket-wheels 53 and 54, mounted on the shaft 50. The adjusting-plates 86 and 87, provided with the studs 86'' and 87'', pivoted in the bearings 86''' and 87''' and adjustably secured to the end of the face-plate 88'''', formed on the swinging-arm 43, by the securing-bolts 89 and 90, passing through the concentric slots 89' and 90', maintain said plates and their appendages in their fixed positions. (See Figs. 3, 4, 28, and 29.)

91 designates the boring-spindle driving-shaft, having the speed-cone 15 firmly secured thereon by the key 15' and journaled in the bearing 5' at one end and in the socket 92, formed on the wheel 93, at its opposite end, said socket journaled in the bearing 92' and having the bevel-wheel 94 firmly secured thereon and meshing with the bevel-wheel 95, having its socket 95' journaled in the bearing 95'', formed on the top casing.

The pinion 96, loosely mounted on the shaft 91 and held in position by the set-collar 96', meshes with the wheel 97, secured on the shaft 97' and journaled in the bearing 98' of the bracket 98''. Said shaft 91 has secured firmly by a suitable key on its opposite end the pinion 99, meshing with the hereinbefore-described socket-wheel 93, said wheel and the the pinion 96, having the clutch-teeth 93″ and 96′, adapted to engage and disengage alternately with the clutch-teeth 98‴, formed on the clutch 98. Said clutch, having its set-pin 98⁗ passing through the slot 91′, formed in the shaft 91, permits the same to slide longitudinally thereon and to turn therewith.

The clutch 98 is provided with the annular groove 99′, adapted to receive the clutch-blocks 99″, said blocks pivotally secured to the fork-lever 100 by the set-screws 100′, said fork-lever secured on the inner end of the shaft 101, journaled in the bearing 101′, formed on the bracket 98″, said shaft also provided with the lever 102, secured on its outer end for the purpose, manually operating the clutch mechanism.

103 designates the revoluble and non-revoluble boring-spindle journaled at its bottom end in the bearing 104′, formed on the raising and lowering arm 104, hereinafter described, and secured and held in its position vertically by the locking nuts or collars 104″, said spindle being provided with the longitudinal key-way 103′, extending through its length and freely fitting the key 103″ of the socket 95′, freely sliding or telescoping therein and adapted to turn therewith.

105 designates the vertical friction-shaft journaled at its top end in the bearing 105′, formed on the bracket 98″ and having its bottom end journaled in the bearing 106′, formed on the step-hanger 106 and its reduced step end journaled in the raising and lowering step 106″, threaded and screwed in said hanger and operated by the hand-wheel 107, secured on the lower end thereof by the securing-nut 107′, said end shaft 105, pivotally secured in said step by the pins 105″, freely fitting the bearing-groove 107‴, formed in said step-journal, thus permitting the step to be raised and lowered while the shaft 105 is in rotation to move the friction-wheel 108 nearer to or farther from the upper or lower peripheries of the outer surface of the wheel 93 to produce either a quicker or a slower rotative velocity in either direction, as required.

111, Figs. 1 and 7, designates the intermediate or worm driving-shaft journaled in the bearing 112′, formed on the arm 112, secured by a suitable set-screw 112″ to the neck 113′, formed on the outer and inner casings 113 and 114 and having its opposite end journaled in the bearings 113″ and 114′, formed on said casing.

115 designates the intermediate worm-wheel, (see particularly Figs. 11 and 12,) loosely mounted on the shaft 111 and meshing with the worm 109, from which it derives its motion. Said wheel 115 is provided with the annular chamber 115′, adapted to engage the friction-clutch 116, loosely mounted on the shaft 111, and adapted to turn therewith, to slide longitudinally thereon, and held in position by the key 116′, said friction-wheel clutch engaged and disengaged by the hand-wheel 117, screwed on the threaded end 115″, formed on the shaft 111.

The casings 113 and 114 are preferably constructed in two parts, with the inner casing 113 firmly bolted to the column 4 and the outer casing removably secured to said inner casing by the bolts 114″, thus completely incasing the worm 119 and its wheel 120, hereinafter described.

118 designates the operating hand-wheel, secured on the shaft 111 by the nut 118′, provided for the purpose of rotating said shaft manually when the clutch 116 is disengaged.

119 designates the rack-shaft worm secured on the shaft 111 by a suitable key and meshing with the wheel 120, loosely mounted on the shaft 121.

122 designates the rack-shaft hand-wheel secured on the shaft 121 and provided with the cylindrical chamber 121′, formed on one of the arms thereof and adapted to receive the set-pin 122′, said pin being forced outwardly to engage by the spring 122″ and withdrawn manually to disengage the holes 120″, formed in the annular flange 120′, formed on the face of the wheel 120.

123 designates the rack-pinion firmly secured on the rack-shaft 121 by a suitable key 123′ and meshing with the rack 124, secured on the supporting-arm of the revoluble spindle by the securing-bolts 124′.

128 designates the guideways of the raising and lowering arm 104, freely and accurately fitting and adapted to slide on the guides 129, formed on and extending along the front of the column 4, said arm being held firmly in contact with said guides by the clamping-plates 129′, secured by the bolts 128′.

130 designates the facing-tool holder provided with concentric bolt-slots 130′, receiving the securing-bolts 130″, thus permitting the said tool-holder to be rotated a small portion to either side to set the facing-tool 131 to any desired angle.

On the carriage 132, to which is secured the tool-holder 130, are formed the ways 132′, accurately fitting the guides 133, formed on the arm 104, said carriage being held firmly against said guides by the clamping-plates 133′ and their bolts 133″ and moved inwardly and outwardly by the manually-operated feed-screw 134′, journaled in the bearing 134, formed on the arm 104, and screwed in the boss 134″, formed on the outer face of the carriage 132.

The clutch-springs 110, 125, 126, and 127 are provided for the purpose of promptly disengaging the clutches when their engaging hand-wheels are released.

The top of the spindle 32 may be threaded to fit any suitable clutch or chuck, as 135, having the clamps 136, removably secured thereon by the bolts 136′.

137 designates the truing-roller, which I introduce between the turret-tool holders 71 and 72, and 138 is its mandrel adapted to loosely fit the central hole of said roller and the cores of the turrets 71 and 72, which roller, journaled on said pin, I use for centering the piece to be turned on the chuck 135, the application of which I will hereinafter describe. The roller (see particularly Fig. 33) 137 is preferably of a diameter slightly greater than the upper and lower flanges of the turret tool-holders 71 and 72, and should be within the circle described by the cutting-points of the turning-tools to permit said tools to be put in operation without removing said roller from between said turrets.

The operation of my machine is as follows: The pulley or piece to be turned or bored, or both, (shown in dotted lines in Figs. 3 and 4,) is first adjustably, or not too tightly, held by the clamps 136 and their bolts 136' to the chuck 135. The carriages 81 and 82 are traversed a distance apart to permit the truing-roller 137 to be inserted between the top and bottom turret tool-holders 71 and 72, and the spindle or mandrel 138 is dropped down through the core of said turrets and the central hole formed in the truing-roller to form a journal for the latter and to hold it in its proper position concentric with the center of said turrets. The pulleys 13 and 14 are rotated by the main belt on the driving-pulley 11, and may be kept in continuous rotation without causing the entire machine to be in motion, as will be hereinafter shown. The turning-spindle 32 is now caused to rotate rapidly by moving the lever 28 outwardly to engage the key 26 with the clutch 18', and the swinging arm 43 is swung gradually inward toward the piece to be turned by the hand-crank 139, (care being taken to previously rotate the turret tool-carriers 71 and 72 till their turning-tools are out of their working position,) and causing the truing-roller 137 to contact with the rapidly-revolving piece and to force it into its position concentric with its axis of rotation, after which the turning-spindle is stopped by moving the lever 28 into its intermediate and disengaging position to disengage the clutch-key 26 with the clutches 18' and 24'. The piece to be turned is now rigidly and securely clamped on the chuck 135, as hereinbefore described. The swinging arm being now in the position shown in Fig. 3, and its feed-screw 65 having its driving-gearing 64' and 64'' disconnected, holds said arm in position while the turning-tools are in operation. The tool-holding turrets 71 and 72 are now rotated to bring the proper turning-tools into their working position, and the clutch-lever 28 is moved into its extreme and opposite position to engage the key 26 with the clutch 24' to rotate the boring-spindle 32 at its proper boring speed. It is obvious that the tools of the turrets may be of different forms to suit the various classes of work and that either of the tools may be brought into cutting position by rotating the turret and clamping the same in its bearings, as hereinbefore described.

It is also obvious that the spindle 103 and its boring-bar $b$ may be rotated in the same direction as the spindle 32 by crossing the belt connecting the speed-cones 13 and 15 and in the contrary direction by connecting said pulleys by means of the usual open belt. I employ this method of obtaining a great range of velocity ratios between the boring and turning spindles to meet the requirements of extreme cases in practice. To perform the operation of boring simultaneously with that of turning, the clutch 116 is engaged by screwing the hand-wheel against said clutch, thus communicating the rotative motion of the vertical friction-shaft 105 to the shaft 111, thence to the shaft 121 by the worm-gearing, hereinbefore described, and to the rack 124, meshing with its pinion 123, thus raising or lowering the arm 104 to give the desired feed to the boring-bar $b$. To withdraw the boring-bar, the stop-pin 122' is pulled outwardly to disengage the holes 120', thus permitting the hand-wheel 122 and the shaft to which it is secured to be rotated to quickly raise the said boring-bar and its spindle 103.

When it is desirable to cut a keyway or to "key-seat" the eye of the pulley, the set-screw $96^s$, Fig. 18, is screwed into the disk $96^d$, formed on the pinion 96, (see particularly Figs. 17 and 18,) and is screwed inwardly till it engages the hole or eye $15^e$, formed on the stepped cone 15, and the clutch 98 is then engaged with the clutch-teeth 96', formed on the pinion 96, thus effectually preventing the shaft 91, and consequently the spindle 103 and its connections, from rotating. The spindle 103 having its boring-bar $b$ replaced by a suitable key-seating tool, the spindle 32 is held stationary by disconnecting the clutch-key 26 from either of the clutches 18' and 24' and moved in its central position (see Fig. 31) by means of the lever 28, thus completely stopping the lower driving and feed mechanism of the swinging arm.

When such pieces of mechanism as hubs, &c., are required to be turned, the arm 104 (see Figs. 13, 14, 19, and 20) is moved downwardly the requisite distance, and the facing-tool 131 and its carriage or rest 132 are traversed by the feed-screw 134' to remove the required amount of surface.

When it is desired to turn the inner as well as the outer surfaces of pulleys, the tool-rest 132 is moved outwardly on the raising and lowering arm till it contacts sufficiently with the inner surface of the rim. Then the feed mechanism of the raising and lowering arm 104 is brought into operation to raise said arm and the facing-tool 131 and its rest 132, thus traversing the latter across the surface to be turned. If taper is required, a lengthening tool-holding bar is placed in the tool-holder 130, arranged to oscillate on its carriage 132 by suitable means, while the upper portion of said bar is passed through a guide or swivel set at a point nearer to the rotative center of the pulley. Thus it will be seen that as the tool-rest 132 travels vertically the facing-tool 131 will be carried forward and beyond the vertical plane of said tool-rest. This machine may also be made with its boring and turning spindles placed and arranged in a horizontal position without departing from the spirit of my invention; but I prefer to construct the machine with said spindle in a vertical position, as hereinbefore described, in order to facilitate the use of the swinging arm by taking advantage of the laws of gravity. When it is desired to turn the pulleys with a tapered or crowned face, the adjusting-plates 86 and 87, (see Fig. 4, showing said plate in dotted lines) are set at the angle to which the facing-tools have to cut by swinging said plates on their pivots 86″ and 87″, and when properly adjusted to their required angles are firmly secured to the plate 88″″, formed on the end of the swinging arm by the securing-bolts 89 and 90.

It is obvious that the traversing carriages 81 and 82, carrying the turret tool-holders 71 and 72 and their carriages 73 and 74, mounted on said carriages 81 and 82, moved on their guideways 86′ and 87′ by their traversing screws 88 and 89, hereinbefore described, will travel simultaneously or alternately, as desired, farther from or nearer to each other, as desired, and in angles conforming with the angles of said adjusting-plate, thus turning the different angles of inclination termed "crown" in one operation.

The facing-tools 79′ and 80′ of the turrets may be operated either alternately or simultaneously, or they may both be stopped by disengaging either or both the clutches 55 and 56, and their velocity ratios of translation along the face of the pulley to be turned, may be varied by moving the friction-wheel 44 nearer to or farther from the periphery of the disk 37 while the machine is in rotation.

The rotative velocity and the direction of rotation of the shaft 105 for the boring-spindle feed are varied and regulated by screwing the step 106″ upwardly or downwardly, as hereinbefore described.

I am aware that previous to my invention other machines have been constructed and used to simultaneously turn and bore; but these I find by experience are open to many serious mechanical objections, particularly that class of machine termed "pulley-lathes," which, in order to facilitate their manipulation, place the turning-tools on diametrically-opposite sides of the piece to be turned, which has the effect of creating undue stress and vibration throughout the machine and the piece operated upon, and, further, while one tool is cutting deeply in passing through an enlarged inequality of surface it causes the pulley or piece to spring and to press against the opposite turning-tool, thereby removing an excessive amount of material from the surface of said pulley and turning it unevenly and out of true. This class of machine is open to still further objections. Much time is consumed in changing it to operate on a larger or smaller pulley, due to the necessity of resetting the opposite tool-rests and also changing the tools while turning one pulley.

The advantages of my machine are as follows: The turning-tools, being both placed in contact with the piece on only one side, will press the turning spindle outwardly and from said tools—that is, in only one direction—which force is resisted by the bearing of the boring-spindle and its bearing, both of which are for this reason made very strong, thereby effectually overcoming any tendency to alternate or sympathetic vibration, and thus producing a true and superior surface on the piece turned and accomplishing this at a very rapid rate. When a diametrically larger or smaller piece is to be turned, the swinging arm has only to be moved the requisite distance inwardly or outwardly, the conditions as to parallelism and angularity being maintained in the new position. The requisite cutting-tools may be instantly brought into operation by rotating the turret tool-holders until said tools are brought into play, and while in operation tools of other form may be removed for the purpose of sharpening or repairing, &c.

Having thus fully described the nature and operation of my invention, what I claim as new and useful, and desire to cover by Letters Patent of the United States, is—

1. In a turning-lathe, the combination, with a revoluble spindle, its supporting-frame, and an upper spindle-supporting column having its axis parallel with said revoluble spindle, of a swinging arm journaled on said column, suitable turning-tools pivotally and adjustably mounted and secured thereon, and means whereby the said tools may be independently operated and said arm may be swung nearer to or farther from the piece to be turned, substantially as set forth.

2. In a turning-lathe, the combination, with a revoluble vertical spindle, its supporting-frame, and an upper spindle-supporting column having its axis parallel with said revoluble spindle, of a swinging arm journaled on said column, suitable turning-tools pivotally and adjustably secured and mounted on said arm, and means whereby said tools may be independently operated and said arm may be swung nearer to or farther from the piece to be turned, substantially as set forth.

3. In a turning-lathe, the combination, with a revoluble spindle, means for rotating the same, a supporting-frame, and an upper spindle-supporting column having its axis parallel with the axis of said revoluble spindle, of a swinging arm journaled on said column, suitable turning-tools pivotally and adjustably mounted and secured on the end of said arm and adapted to traverse along the face thereof, and means whereby said tools may be independently and automatically operated and said arm may be swung nearer to or farther from the piece to be turned, substantially as set forth.

4. In a turning-lathe, the combination, with a revoluble spindle, means for rotating the same, a suitable supporting-frame, and an upper spindle-supporting column having its axis parallel with the axis of said revoluble spindle, of a suitable swinging arm journaled on said column, suitable turning-tools mounted on said arm and adjustably secured on said arm and adapted to be traversed along the face thereof, and means for automatically and independently moving said tools outwardly, inwardly, upwardly, downwardly, and for swinging said tools in a plane transverse with the plane of the swing of said arm, substantially as set forth.

5. In a turning-lathe, the combination, with a revoluble spindle, means for rotating the same, a supporting-frame, an upper spindle-supporting column having its axis parallel with the axis of said spindle, and a swinging arm journaled on said column, of suitable interchangeable turning-tools, their upper and lower turret-holders, suitable traversing carriages wherein said turrets are mounted, a suitable guide-plate whereon said carriages are adapted to slide, and means for traversing said carriages and adjusting said plates whereby the turning-tools may be caused to cut at angles of the same or different inclination with the turning-spindle, substantially as set forth.

6. In a turning-lathe, the combination, with a revoluble turning-spindle, means for rotating the same, a suitable supporting-frame, an upper spindle-supporting column having its axis parallel with said spindle, and a swinging arm journaled on said column, of a suitable turning-tool, its turret-holder, suitable turret supporting and traversing carriages, and means whereby said tools may be moved upwardly, downwardly, inwardly, outwardly, and at varying angles of inclination, substantially as set forth.

7. In a turning-lathe, the combination, with a revoluble spindle, means for rotating the same, a suitable supporting-frame, an upper spindle-supporting column having its axis parallel with the axis of said spindle, and a swinging arm journaled on said column, of suitable turning-tools, their turret-holders, and the turret supporting and traversing carriages wherein said turrets may be rotated and whereby they may be caused to simultaneously or independently move apart inwardly and outwardly and at varying angles of inclination, substantially as and for the purpose set forth.

8. In a turning-lathe, the combination, with a revoluble spindle, means for rotating the same, a suitable supporting-frame, an upper spindle-supporting column having its axis parallel with the axis of said spindle, and a swinging arm journaled on said column, of suitable upper and lower turning-tools, their upper and lower interchangeable turret-holders, suitable turret supporting and traversing carriages wherein said turrets may be rotated and whereby they are traversed, and suitable traversing mechanism for the latter, whereby said turrets may be moved apart, inwardly, outwardly, and at the same varying or opposite angles, substantially as and for the purpose set forth.

9. In a turning-lathe, the combination, with a revoluble spindle, its supporting-frame, and a swinging arm with its axis parallel with the axis of said spindle, of the upper and lower turrets and the interchangeable turning-tools secured on the ends thereof, suitable supporting and traversing carriages, and means for moving said turrets apart and upwardly, downwardly, outwardly, and inwardly, substantially as and for the purpose set forth.

10. In a turning and boring mill, the combination, with an upper revoluble and non-revoluble boring-spindle and a lower revoluble spindle and their supporting-frames, of a swinging arm with its axis parallel with said spindles, suitable turning-tools mounted on said arm, and means for swinging them nearer to or farther from said spindles and for raising and lowering said upper spindle, substantially as and for the purpose set forth.

11. In a vertical turning and boring mill, the combination, with an upper revoluble and a non-revoluble boring-spindle, a lower revoluble spindle with its axis coinciding with said upper spindle and a suitable supporting-frame, of a swinging arm journaled on said frame with its axis parallel with said spindles, suitable turning-tools mounted thereon, and means for automatically swinging said arm and for raising and lowering said upper spindle while said lower spindle is in rotation, substantially as and for the purpose set forth.

12. In a boring and turning mill, the combination, with a revoluble raising and lowering boring-spindle, a lower revoluble spindle vertically under said upper spindle, and a suitable supporting-frame, of a swinging arm journaled on said frame with its axis parallel with said spindles, suitable turning-tools mounted thereon, and means for automatically swinging said arm, for driving said spindles, and for automatically raising and lowering said boring-spindle, all substantially as and for the purpose set forth.

13. In a boring and turning mill, the combination, with a revoluble raising and lowering boring-spindle and a lower revoluble spindle, of an adjustable radial swinging arm, suitable turning-tools mounted thereon, and means for automatically swinging said arm inwardly and outwardly and for traversing said tools in opposite directions, substantially as and for the purpose set forth.

14. In a boring, turning, and facing mill, the combination of a raising and lowering spindle, its supporting-arm, a tool-carrying rest fitted and adapted to slide on said arm at right angles to said spindle, a suitable supporting main frame, a spindle-supporting column having its axis parallel with the axes of said spindles, a swinging arm journaled on said column, suitable upper and lower turret tool-holders, their supporting and traversing carriages mounted on said arm, and means for simultaneously or independently rotating said spindles and automatically traversing said turrets in opposite directions and for swinging said arm inwardly and outwardly, substantially as and for the purpose set forth.

15. In a boring-mill, the combination, with a boring-spindle, a spindle-supporting column, and a spindle - supporting arm fitted and adapted to slide upwardly and downwardly on the face of said column, of a tool-carrying rest fitted and adapted to be traversed along said arm in a line at right angles to said spindle, substantially as set forth.

16. In a boring-mill, the combination, with a boring-spindle, its supporting-column having its axis parallel with the axis of said spindle, the frame supporting the latter, and the spindle-supporting arm adapted to slide upwardly and downwardly on the face of said column, of a tool-carrying rest fitted and adapted to slide on said arm in a line at right angles to said spindle, and means for adjusting said tool to any angle, substantially as set forth.

17. In a turning-lathe, the combination, with a revoluble spindle, its supporting-column having its axis parallel with the axis of said spindle, the frame supporting the latter, and the spindle-supporting arm fitted and adapted to slide upwardly and downwardly on the face of said column, of a tool-carrying rest fitted and adapted to slide inwardly and outwardly on said arm and at right angles with said spindle, and means whereby said tool may be adjusted to turn or cut continuously at or in any desired path or angle of any inclination to said revoluble spindle, substantially as and for the purpose set forth.

18. In a turning and boring mill, the combination, with a boring-spindle, a turning-spindle and its supporting-arm, and a suitable supporting-frame, of a tool-supporting swinging arm journaled on said frame, a tool-carrying rest fitted and adapted to slide on said spindle-supporting arm, and means whereby the tool of the latter may be adjusted to traverse and to cut continuously at any required angle while said boring and turning spindles are in rotation, substantially as and for the purpose set forth.

19. In a turning and boring mill, the combination, with a turning-spindle, a boring-spindle, and its supporting-arm and suitable supporting framing, of a tool-carrying swinging arm journaled on said frame with its axis parallel with said spindles, a tool-carrying rest fitted and adapted to slide on said spindle-supporting arm on a line at right angles with said spindles, and means whereby the latter tool may be adjusted to traverse and to cut continuously at any required angle while said spindles are in rotation, substantially as and for the purpose set forth.

In testimony whereof I have hereunto set my hand in the presence of two subscribing witnesses.

JAMES B. ALLFREE.

Witnesses:
THOMPSON R. BELL,
M. H. ESCOTT.